(12) United States Patent
Chang et al.

(10) Patent No.: US 6,937,424 B2
(45) Date of Patent: Aug. 30, 2005

(54) REPEATABLE RUNOUT (RRO) COMPENSATION METHODS AND APPARATUS FOR DATA STORAGE DEVICES

(75) Inventors: Jen-Yuan Chang, San Jose, CA (US); Jay Francis Raley, San Jose, CA (US)

(73) Assignee: Hitachi Global Storage Technologies Netherlands N.V., Amsterdam (NL)

(*) Notice: Subject to any disclaimer, the term of this patent is extended or adjusted under 35 U.S.C. 154(b) by 252 days.

(21) Appl. No.: 10/436,480

(22) Filed: May 12, 2003

(65) Prior Publication Data

US 2004/0228026 A1 Nov. 18, 2004

(51) Int. Cl.$^7$ .............................................. G11B 5/584
(52) U.S. Cl. ...................................................... 360/77.04
(58) Field of Search ............................ 360/77.04, 78.09

(56) References Cited

U.S. PATENT DOCUMENTS

| | | |
|---|---|---|
| 4,135,217 A | 1/1979 | Jacques et al. |
| 4,412,161 A | 10/1983 | Cornaby |
| 4,788,608 A | 11/1988 | Tsujisawa |
| 5,585,976 A | 12/1996 | Pham |
| 5,646,797 A | 7/1997 | Kadlec et al. |
| 5,680,272 A | 10/1997 | Kadlec et al. |
| 5,684,650 A | 11/1997 | Kadlec et al. |
| 5,886,846 A | 3/1999 | Pham et al. |
| 5,914,830 A | 6/1999 | Kadlec et al. |
| 5,949,605 A | 9/1999 | Lee et al. |
| 5,999,357 A | 12/1999 | Serrano |
| 6,005,742 A | 12/1999 | Cunningham et al. |
| 6,097,565 A | 8/2000 | Sri-Jayantha et al. |
| 6,115,203 A * | 9/2000 | Ho et al. ................ 360/77.04 |
| 6,239,940 B1 | 5/2001 | Sasamoto et al. |
| 6,310,742 B1 | 10/2001 | Nazarian et al. |
| 6,347,018 B1 | 2/2002 | Kadlec et al. |
| 6,594,106 B1 * | 7/2003 | Serrano et al. ........... 360/78.09 |
| 6,609,074 B2 * | 8/2003 | Shteinhauz ............... 702/75 |
| 2001/0043427 A1 | 11/2001 | Chen et al. |
| 2002/0012191 A1 | 1/2002 | Ho et al. |

OTHER PUBLICATIONS

J. Fox, "Runout Compensator For Disk File", IBM Technical Disclosure Bulletin (TDB), Jan. 1989, vol. 31, No. 8, pp 453–4.

* cited by examiner

Primary Examiner—David Hudspeth
Assistant Examiner—K. Wong
(74) Attorney, Agent, or Firm—John J. Oskorep, Esq.

(57) ABSTRACT

In one illustrative example, a method for use in reducing Repeatable Run Out (RRO) error in a data storage device involves obtaining an RRO measurement for each track of a limited number of N disk tracks; characterizing the RRO measurement for each track with real and imaginary values by performing a discrete Fourier transform (DFT) calculation on each RRO measurement; performing a least-squares fit on all of the real values to identify a first set of (n+1) coefficients of an nth-order polynomial function which is a function of disk track r and representable in the form $A_i(r) = a_n r^n + a_{(n-1)} r^{(n-1)} + \ldots + a_1 r + a_0$; and performing a least-squares fit on all of the imaginary values to identify a second set of (n+1) coefficients of an nth-order polynomial function which is a function of disk track r and representable in the form $B_i(r) = b_n r^n + b_{(n-1)} r^{(n-1)} + \ldots + b_1 r + b_0$. RRO compensation is performed based on the relation $D_{RRO}(r, s) = \Sigma_{i \text{ for all } H} \{A_i(r)\cos(i(s2\pi/\text{total\_sectors})) + B_i(r)\sin(i(s2\pi/\text{total\_sectors}))\}$ where $D_{RRO}$ is the estimated RRO error; r is a track number; s is a sector number at track number r; i is an RRO harmonic number; H is a set of harmonics to be compensated; and total_sectors is a total number of sectors along track number r. Advantageously, RRO variations across the disk can be accurately compensated for with use of a small amount of memory.

30 Claims, 7 Drawing Sheets

| HARMONIC | TRACK NO. | FOURIER TRANSFORM RESULTS | |
|---|---|---|---|
| | | REAL VALUE | IMAGINARY VALUE |
| 1X | 1 (OD) | $V_1$ | $V_2$ |
| | 2 | $V_3$ | $V_4$ |
| | ⋮ | ⋮ | ⋮ |
| | N (ID) | $V_5$ | $V_6$ |
| 2X | 1 (OD) | $V_7$ | $V_8$ |
| | 2 | $V_9$ | $V_{10}$ |
| | ⋮ | ⋮ | ⋮ |
| | N (ID) | $V_{11}$ | $V_{12}$ |
| 3X | ⋮ | ⋮ | ⋮ |
| ⋮ | ⋮ | ⋮ | ⋮ |
| $l$ | 1 (OD) | $V_{13}$ | $V_{14}$ |
| | 2 | $V_{15}$ | $V_{16}$ |
| | ⋮ | ⋮ | ⋮ |
| | N (ID) | $V_{17}$ | $V_{18}$ |

| HARMONIC | COMPONENT | POLYNOMIAL COEFFICIENTS | | | |
|---|---|---|---|---|---|
| | | $n^{TH}$ ORDER | $(n-1)^{TH}$ ORDER | ... | $0^{TH}$ ORDER |
| 1X | REAL | $a_{1\_n}$ | $a_{1\_\{n-1\}}$ | ... | $a_{1\_0}$ |
| | IMAGINARY | $p_{1\_n}$ | $p_{1\_\{n-1\}}$ | ... | $p_{1\_0}$ |
| 2X | REAL | $a_{2\_n}$ | $a_{2\_\{n-1\}}$ | ... | $a_{2\_0}$ |
| | IMAGINARY | $p_{2\_n}$ | $p_{2\_\{n-1\}}$ | ... | $p_{2\_0}$ |
| 3X | REAL | $a_{3\_n}$ | $a_{3\_\{n-1\}}$ | ... | $a_{3\_0}$ |
| | IMAGINARY | $p_{3\_n}$ | $p_{3\_\{n-1\}}$ | ... | $p_{3\_0}$ |
| ⋮ | ... | ... | ... | ... | ... |
| | ... | ... | ... | ... | ... |
| $i$ | REAL | $a_{i\_n}$ | $a_{i\_\{n-1\}}$ | ... | $a_{i\_0}$ |
| | IMAGINARY | $p_{i\_n}$ | $p_{i\_\{n-1\}}$ | ... | $p_{i\_0}$ |

REPEATABLE RUNOUT (RRO) COMPENSATION METHODS AND APPARATUS FOR DATA STORAGE DEVICES

BACKGROUND OF THE INVENTION

1. Field of the Invention

This invention relates generally to servo control for data storage devices, and more particularly to repeatable runout (RRO) compensation methods and apparatus for servo-controlled data storage devices.

2. Description of the Related Art

High precision design is required for direct access storage devices (DASDs), such as disk drives. Without limiting operating vibration performance, the servo architecture of a DASD should be capable of providing a low positioning error for its read/write heads. In a track following mode, a disk actuator servo intends to minimize the head position error in the presence of both repeatable runout (RRO) and non-repeatable runout (NRRO) components in a position error signal (PES). The RRO component, which could be any repeated deviation from an ideal circular track due to, for example, mechanical tolerances or servo writing, may present itself as a repetitive disturbance having a fundamental frequency and several harmonics.

There are many conventional methods for minimizing head positioning error by reducing the RRO component. Many of these techniques attempt to reduce the RRO at the manufacturing level by imposing very severe manufacturing tolerance requirements, or by implementing gain enhancing algorithms, such as feedforward or narrow band filters at RRO spectral frequencies. However, these approaches either require high cost manufacturing methods or increased track following voice coil motor (VCM) power.

Figure 1:
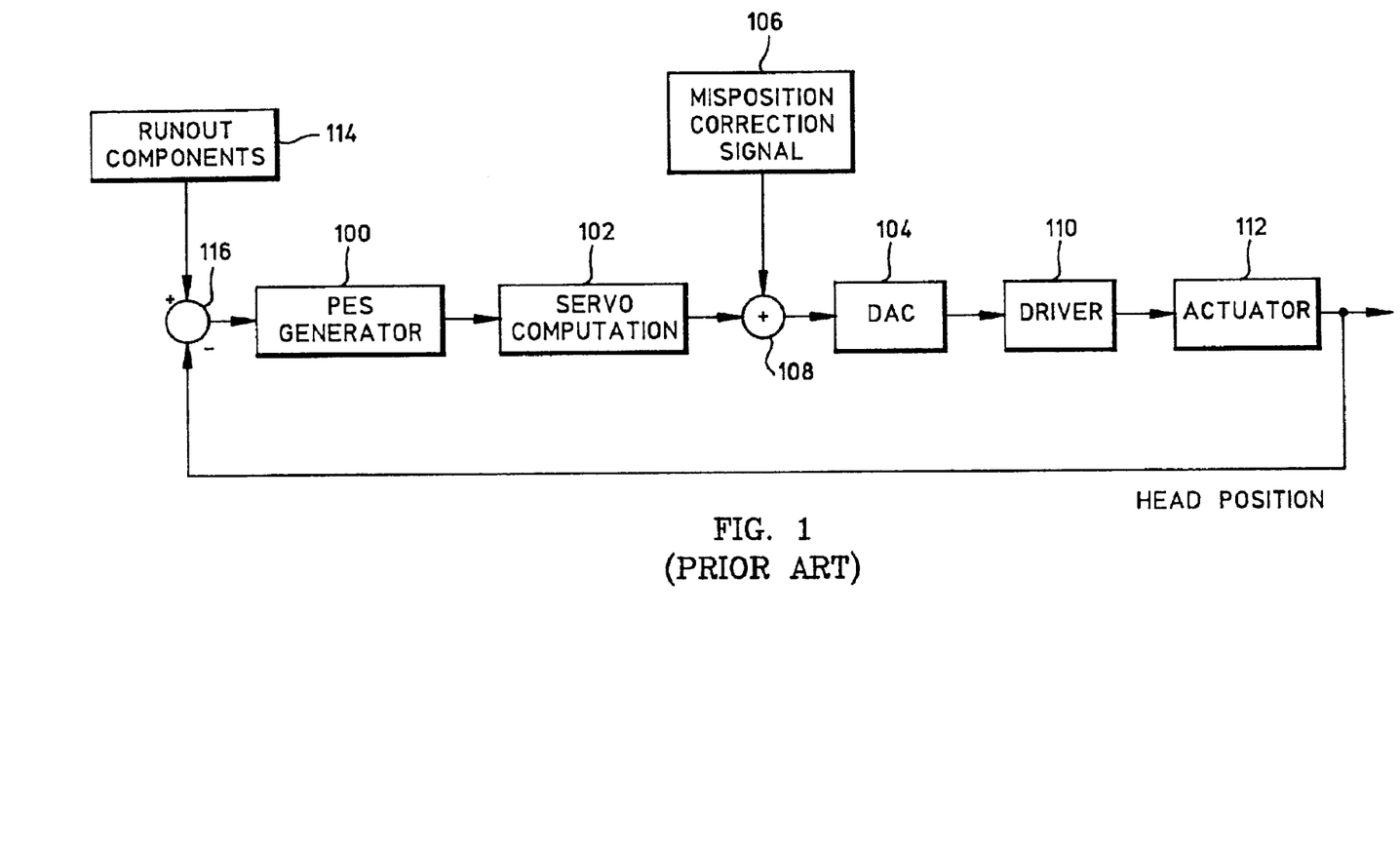
FIG. 1 is a conventional servo scheme of a data storage device which utilizes a feedforward signal to reduce repeatable runout (RRO) error.

In FIG. 1, a typical DASD servo has an overall structure which includes a PES generator 100, a servo computation block 102, and a digital-to-analog converter (DAC) 104. The structure also involves a feedforward scheme which includes a misposition corrector 106 for improving track following capability. As shown in FIG. 1, an output of misposition corrector 106 is summed with an output of servo computation block 102 at a summing node 108. The summed output at node 108 is then provided to DAC 104. An analog output of DAC 104 is then provided to a current driver 110 which provides current to the VCM of an actuator 112, which represents the mechanical components that control the position of a transducer which interacts with a data storage medium of the DASD.

The control signal fed into PES generator 100 is initially computed based on a PES signal derived from the data surface. The PES signal is processed by servo computation block 102 and modified by a misposition correction signal (also called a "feedforward" signal) output from misposition corrector 106. The signal into PES generator 100 is the relative difference between a head position signal received from actuator 112 and runout components 114 of a disk track, which invariably contains both RRO and NRRO components. While a subtraction node 116 is shown, this is in fact a theoretical node as it is only the difference generated by PES generator 100 that is available when the recording head signal is processed for use by the servo loop. Misposition corrector 106 is designed to produce a misposition correction signal which cancels or reduces signals of runout components 114.

It has been observed that RRO components vary as a function of disk position, not only radially (i.e. across tracks, e.g. from inner to outer tracks) but circumferentially as well (i.e. across sectors, e.g. from sector to sector along the same track). Some conventional compensation schemes provide for RRO compensation based on disk location. However, the known prior art does not focus on a "global" learning scheme to compensate for RRO. Some of the prior art techniques consider all disk tracks as a whole using an averaging function, but they do not take into account variations of amplitude and phase across the disk. Other techniques focus on learning RRO characteristics of each track, but this requires a large amount of memory. Efficiencies in computation, design, and memory use are all desirable features to have in an RRO compensation scheme.

Figure 2:
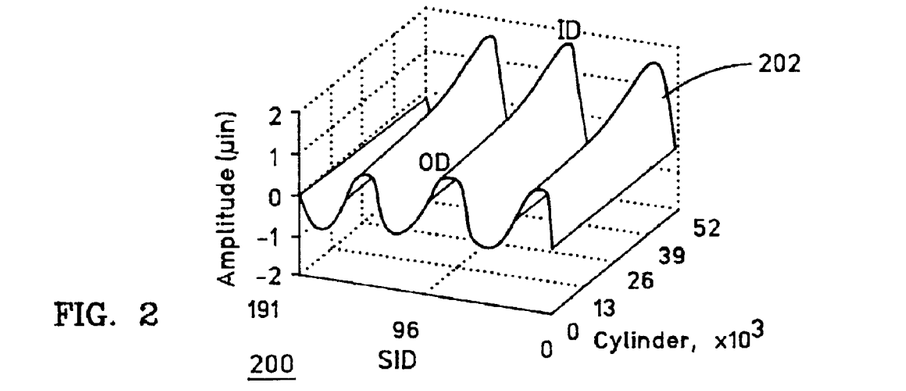
FIG. 2 is a three-dimensional graph which illustrates an example of RRO variation with respect to cylinder number and sector number.

FIG. 2 is a three-dimensional graph 200 which reveals an RRO harmonic amplitude component 202 with respect to cylinder number (e.g. track number) and sector number of a disk drive. As illustrated, RRO characteristic 202 is shown to vary from sector to sector in a sinusoidal fashion over the disk. As shown, there is a "ramping" of the RRO from the outer diameter (OD) to the inner diameter (ID) of the disk. This particular ramping is due to a periodically distributed clamping force from screws on top of a disk clamp of the disk drive. There is a similar RRO variation due to thermal expansion mismatch between the hub and the disk.

Figure 3:
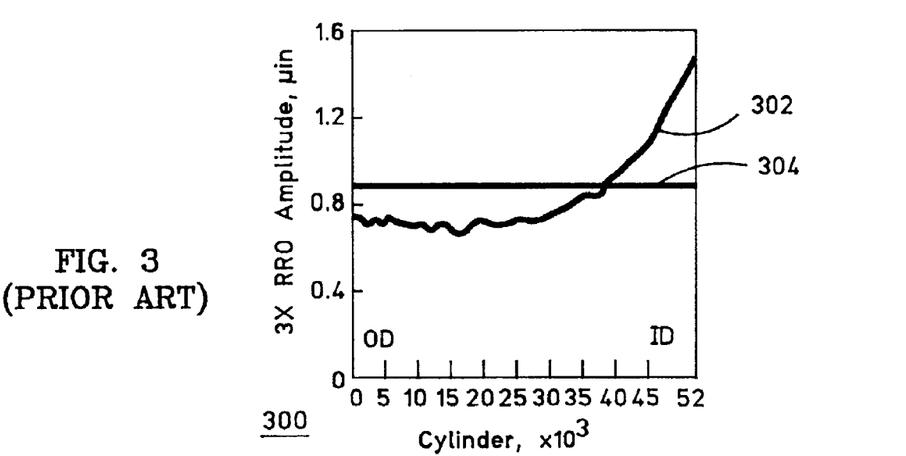
FIG. 3 is a graph which illustrates an example of RRO variation with respect to cylinder number and an example of a prior art compensation signal intended to reduce the RRO.
Figure 4:
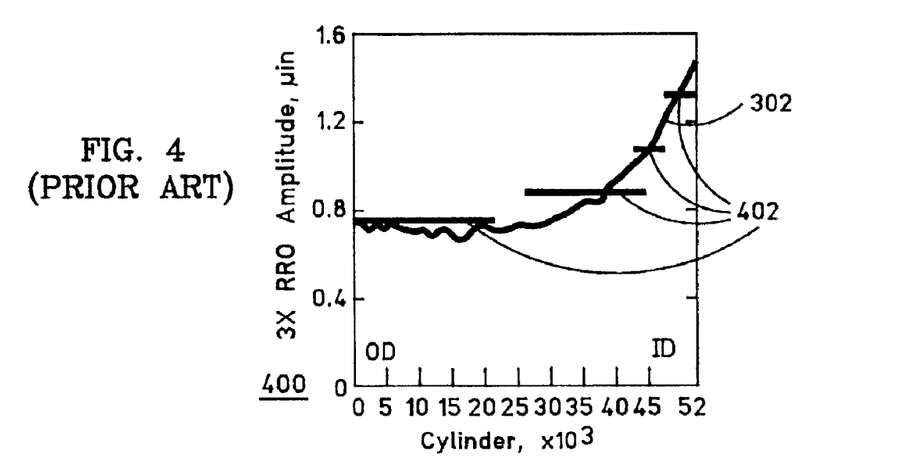
FIG. 4 is a graph which illustrates the RRO variation with respect to cylinder number, and another example of a prior art compensation signal intended to reduce the RRO.

FIG. 3 is a graph 300 which reveals an RRO characteristic 302 with respect to cylinder number and a prior art compensation signal 304 intended to reduce the RRO. In this example, compensation signal 304 is generated based on an average of RRO measurements from track to track. As apparent from FIG. 3, compensation signal 304 is not entirely suitable to accurately reduce RRO characteristic 302. In FIG. 4, a graph 400 which reveals RRO characteristic 302 with respect to cylinder number and another prior art compensation signal 402 intended to reduce the RRO. In this example, compensation signal 402 is generated from a plurality of RRO measurements from disk track to disk track, each measurement of which must be stored. As apparent from FIG. 4, compensation signal 402 is also not entirely suitable to accurately reduce and RRO characteristic 302 and a relatively large amount of memory must be utilized.

What are needed are improved methods and apparatus for RRO compensation for data storage devices.

SUMMARY OF THE INVENTION

Repeatable runout (RRO) compensation methods and apparatus for data storage devices are disclosed. In one illustrative example, a method for use in reducing RRO error in a data storage device involves obtaining an RRO measurement for each track of a limited number of N disk tracks of a disk; characterizing the RRO measurement for each track with real and imaginary values by performing a discrete Fourier transform (DFT) calculation on each RRO measurement; performing a least-squares fit on the real values to identify a first set of (n+1) coefficients of an nth-order polynomial function which is a function of disk track r and representable in the form $A_i(r)=a_n r^n + a_{(n-1)} r^{(n-1)} + \ldots + a_1 r + a_0$; and performing a least-squares fit on the imaginary values to identify a second set of (n+1) coefficients of an nth-order polynomial function which is a function of disk track r and representable in the form $B_i(r) = b_n r^n + b_{(n-1)} r^{(n-1)} + \ldots + b_1 r + b_0$. RRO compensation is performed by finding the estimated RRO error based on the relation $D_{RRO}(r, s) = \Sigma_{i \text{ for all } H} \{A_i(r)\cos(i(s2\pi/\text{total\_sectors})) + B_i(r)\sin(i(s2\pi/\text{total\_sectors}))\}$, where r is a track number; s is a sector number at track number r; i is an RRO harmonic number; H is a set of harmonics to be compensated; and total_sectors is a total number of sectors along track number r. Advantageously, RRO variations across the disk can be accurately compensated for with use of a small amount of memory.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

The Fourier Transform. A few centuries ago, a French mathematician named Fourier became famous for his theory that any waveform could be decomposed into a set of frequencies each having a unique amplitude and phase. Each one of these amplitude and phase components for a given frequency describes the displacement contribution at any point in time for that frequency. At any point in time, the combined displacement contributions of the entire set of frequencies will exactly describe the original waveform displacement measured at that point in time. The process of changing a "time domain" waveform into a "frequency domain" description is called a "Fourier transform". The process of changing the frequency domain description back into the time domain waveform is called an "inverse Fourier transform".

If one considers that a sinusoidal wave is 50% of the time above the x-axis (positive) and 50% of the time below the x-axis (negative), the Fourier transformation process is easy to understand. For whole number of cycles, the positive area above the x-axis is equal to the negative area below the axis. The sum of these two areas will equal to zero (0). To accumulate the areas above and below the waveform is to "integrate" the waveform. The integral of any pure sinusoidal waveform for any whole number of cycles will always be zero (0). Similarly, if the sinusoidal waveform was multiplied with a random "noise" waveform and then integrate, the integral should end up being close to zero.

If two sinusoidal waves of the same frequency that are "in-phase" are multiplied together (i.e. squared), then at every point the multiplication will result in a positive number and the integral will be positive. If one of the sinusoidal (180 degrees out-of-phase) is inverted, then at every point the multiplication would result in a negative number and the integral would be negative. If one of the waveforms was out-of-phase by ±90 degrees, then the integration along the way would sometimes be positive and sometimes be negative, but the total integral would end up being zero. Multiplying the waveform of interest with two (2) waveforms of a particular frequency, one in-phase (the cosine) and the other 90 degrees out-of-phase (the sine), and integrate both with the results called "x" and "y", then the magnitude and phase of the frequency of interest can be calculated based on the following expressions:

$$\text{Magnitude} = (x^2 + y^2)^{0.5}$$

$$\text{Phase} = \arctan(y/x)$$

The pair of numbers (x, y) constitute the basic parts of a "complex" number.

Complex Numbers. Complex numbers are a mathematically convenient way of describing the magnitude and phase of a frequency component of a waveform. The (x, y) pair of numbers are referred to also as the "real" and "imaginary" parts of a complex number. Without going into the properties of complex numbers, suffice it to say that for any waveform consisting of a set of frequency components (F[i], i=0, 1, 2, ..., n), there exists a set of complex numbers (C[i], i=0, 1, 2, ..., n) that accompanies the set of frequencies. Each complex number associated with a particular frequency describes the magnitude and phase of that frequency's contribution to the waveform. If the complex number C is decomposed into its real part (C.x) and imaginary part (C.y), the displacement caused by a particular frequency F can be calculated at any point in time t based on the expression:

$$\text{Displacement component of } F(t) = (C.x)\cos(2\pi Ft) + (C.y)\sin(2\pi Ft)$$

By summing all of the frequency components, the waveform can be calculated at any point in time based on the expression:

$$\text{Displacement}(t) = (C[i].x)\cos(2\pi F[i]t) + (C[i].y)\sin(2\pi F[i]t), \text{ for } i=0, 1, 2, \ldots, n$$

Discrete Fourier Transform. Since Fourier Transforms deal with continuous waveforms, the number of frequencies present can be infinite. However, most waveforms in the real world (e.g. the "digital world") are described by a limited number of points. There is a special name given to a periodic waveform that is composed of equally time-spaced samples: a "discretized periodic waveform". One of the properties of this waveform is that the maximum frequency that is detectable is determined by the sampling rate or sampling frequency. The maximum frequency of the discrete waveform is called the "Nyquist frequency", which is half the sampling frequency of a discrete waveform. The lowest frequency that can be detected in this waveform is called the "fundamental frequency" or the $1^{st}$ harmonic. The fundamental frequency is determined by the time it takes to complete the entire waveform. All of the harmonics which constitute this waveform are whole number harmonics. The highest harmonic, the Nyquist harmonic, turns out to be half the number of points.

Any discrete time waveform can be broken down into the set of whole number harmonics from zero (0) to the Nyquist frequency. This transformation is called a Discrete Fourier Transformation (DFT). If a waveform is centered around the x-axis, such as a Position Error Signal (PES) from a disk drive, then the range of possible harmonics is only from one (1) to the Nyquist frequency. For any discrete waveform, there also exists a set of complex numbers that accompanies the set of harmonics from zero (0) to the Nyquist frequency that can completely describe the waveform. If the total number of real and imaginary numbers were counted, it would equal the number of points of the waveform plus two (2). However, the extra two (2) points are always zero (0), which holds no information. The imaginary part of the "DC" component will always be zero (0) and the imaginary part of the Nyquist will always be zero (0). Therefore, the same number of points actually exist whether considering the frequency domain or the time domain. Given a discrete waveform containing n number of points, a corresponding set of complex numbers that accompanies the harmonics from zero (0) to n/2 exists.

Hard Disk Drives and Repeatable Run Out Error. A waveform signal referred to as "Repeatable Run Out" or "RRO" is that which the methods and apparatus of the present application intend to reduce or eliminate. An RRO waveform in a hard disk drive (HDD) is generally deduced from error measurements relative to the cylinder "track" center, referred to as a Positional Error Signal (PES). The measurement of the PES is done at equally-spaced intervals along the track. In a single rotation of a disk, a number of PES samples are collected from a number of "sectors" along the track. Each sector in the rotation is designated with a unique identification (ID), called the sector ID or SID. The SID numbers are sequential from zero (0) to the total number of sectors minus 1. SID "0" is sometimes referred to as the "index".

An average PES for each SID along the disk track is derived based on repeated PES measurements for each SID. The average PES measurements for all SIDs along the track are collectively referred to as the "RRO" for that track. If the RRO is subtracted from the collected PES, then the averaged difference would be zero (0) for each SID. There would still be random PES noise called "NRRO", but the average PES at each SID would still be zero.

Conventionally, RRO data is collected across the disk surface (i.e. at multiple tracks) to arrive at an average RRO for the disk. This average RRO, which is not a function of disk radius, is used to create a cancellation waveform that is applied to the input controller Voice Coil Motor (VCM), which effectively compensates for the disturbance before it actually occurs (see results in relation to FIGS. 3 and 4 from the Background section). In general, this type of control is called Feed Forward (FF) control. Applied specifically to RRO, the control is generally called RRO FF control.

The Transfer Function. The units of input for FF control are not necessarily the same units of the PES. The input control of the VCM is driven by the units to a Digital-to-Analog Converter (DAC), whereas the units of output are measured in PES. It could be said that the ratio of input units that causes the output units is the Transfer Function (TF), but that would be too simplistic. The reality is that there is a delay involved from the input to the output, which must be considered. That is, the lag time from the DAC input through the VCM and back out again to the PES must be accounted for. In addition, the VCM cannot be expected to have the same displacement in a short single step as it would in a gradual series of increasing steps. This non-linearity of the magnitude and lag (phase) response is characterized by the transfer function and can be expressed as a complex number as a function of frequency.

It is the following conversion factor that allows the units of PES to be translated into DAC units to control the VCM:

$$DAC=(TF)(PES)$$

where TF units are in DAC/PES. This form of TF is typically used to compute the DAC value for a given PES. A fairly simple way to measure the TF of a particular frequency is to excite the VCM with a pure sinusoidal waveform of the given frequency and measure the PES response. Knowing the pure sinusoidal DAC input for a frequency f, its amplitude and phase are expressed as a complex number. Measuring the response by performing the DFT on the PES output waveform, the corresponding complex number for this frequency's output is obtained. Using division for complex numbers, the TF(f) for this frequency is obtained as input(f)/output(f). This excitation is performed for all of the harmonic frequencies to obtain the complete TF. However, a potential problem exists at harmonics that contain large RRO content since the RRO is independent of the excitation. This effect is minimized by exciting the input with a sufficient amount of amplitude to minimize the effect of the RRO in the TF calculation.

Least-squares Fitting of a Polynomial curve. Any curve can be described by a polynomial equation of the form:

$$\text{Polynomial}(t)=A_d t^d + A_{(d-1)} t^{(d-1)} + \ldots + A_2 t^2 + A_1 t^1 + A_0 t^0$$

where d is said to be the "degree" of the polynomial. A flat line is a curve that can be completely described as a polynomial of zero (0) degrees. A curve of zero (0) degrees is independent of any variable and is in fact a simple constant. A line with a slope and an intercept can be completely described as a polynomial of one (1) degree. A parabola can be completely described as a polynomial of two (2) degrees. If three (3) different points along the x-axis are considered, then those points can be smoothly connected by a $2^{nd}$ degree polynomial. If four (4) different points are considered, then those points can be smoothly connected with a 3rd degree polynomial. Five (5) points can be described by a 4th degree polynomial, and so on.

While a polynomial of n−1 degrees that exactly fits n number of points can be created, the "trend" of the points is often chosen with lesser degrees of a polynomial. The distance between each measured point from its polynomial description is called the "error" at that point. By summing the squares of the errors from each of the measured points, the "standard error" of the polynomial can be determined. A "best fit" curve is a mathematical function that inherently provides a minimization of the "standard error" for a given set of points. Generally, the method to identify a best fit curve is referred to as a least-squares fit algorithm.

If fitting is extended to include complex numbers, then the real and imaginary parts of the measured points are fit independently with continuous line equations described as:

$$\text{real}(r)=A_d r^d + A_{(d-1)} r^{(d-1)} + \ldots + A_2 r^2 + A_1 r^1 + A_0 r^0$$

$$\text{imag}(r)=B_d r^d + B_{(d-1)} r^{(d-1)} + \ldots + B_2 r^2 + B_1 r^1 + B_0 r^0$$

In the present application, the real and imaginary parts are independently fit to define a complex curve. Complex coefficients C having a real part A and an imaginary part B are arrived at based on the expression:

$$\text{Complex}(r) = C_d r^d + C_{(d-1)} r^{(d-1)} + \ldots + C_2 r^2 + C_1 r^1 + C_0 r^0$$

which best describes the magnitude and the phase at any r location.

RRO data for a particular frequency are obtained at various radial locations (i.e. tracks) across the disk. A discrete Fourier transform (DFT) is performed on each RRO measurement of each track, so that the RRO data for each track is characterized as a complex number (i.e. with real and imaginary values). This is preferably performed, and needs only to be performed, for a small, limited number of tracks on the disk. These measurements along with their associated radial location are fed into a least-squares fit algorithm to arrive at a polynomial description of the complex curve as a function of radial position for the particular frequency. This is performed for each one of any number of RRO harmonics to be dealt with.

Since the DFT of the RRO PES waveform is performed at a particular track location, a set of complex numbers associated with each harmonic can be identified at that location. By collecting additional sets of complex numbers at various radial locations, a set of complex polynomial curves can be deduced, one for each harmonic, which describes the "best fit" given the limited degree of the polynomial description, which describes the set of complex numbers associated with the set of harmonics at any radial location. With these complex numbers derived for a particular location, the RRO time waveform can be derived for that location using an inverse DFT.

The curve fitting may be extended to include the TF. Since TF is measured at several locations, a set of complex numbers can be identified, one for each harmonic, for each of the measured locations. In the same way that the RRO can be predicted for each harmonic at any radial location, the TF can also be predicted for each harmonic at any radial location. By multiplying the TF factor into the RRO equations, the set of DAC polynomial equations can be deduced, one for each harmonic, which describes the set of complex numbers for the harmonics at any radial location.

Calibration. "Calibration" is a general term. There are several calibration processes in the manufacture of a disk drive, but there are also calibrations that occur each time the drive is powered up outside the factory. There is yet another form of calibration that can occur while the disk drive is operational, which is referred to as "recalibration" (or recal for short). According to the present application, calibration in the factory is used to determine the transfer function. While it is possible to describe the transfer function with higher degrees of polynomial fitting, in the present embodiment the transfer function is selected as having a polynomial degree of zero (0)—the average. Calculating the TF for all of the harmonics is a relatively time-consuming task, and therefore it is currently delegated to the factory calibration.

On the other hand, the RRO calculation is performed each time the disk drive's motor is "spun up" or powered on. The complex numbers for the RRO harmonics at a few radial locations are collected and used to create the polynomial equations that will describe the harmonics at all radial locations. This is a fairly quick process since the gathering of RRO data at any cylinder will take typically eight (8) spindle revolutions (typically six milliseconds per revolution) for each head present. If RRO data is typically collected at ten (10) different cylinders, the gathering of data would total 80 revs multiplied by the number of heads which can then be fitted to predict the RRO at any radial location.

As the drive changes temperature, the various components can expand or contract at different rates to thereby cause physical stresses that may change the RRO from that which was measured at power up. When this happens, the drive may suffer degradation in its performance such that a request to recal may be issued. The recal process will again recalculate the RRO for the new operating conditions which should improve the RRO FF capability.

Figure 5:
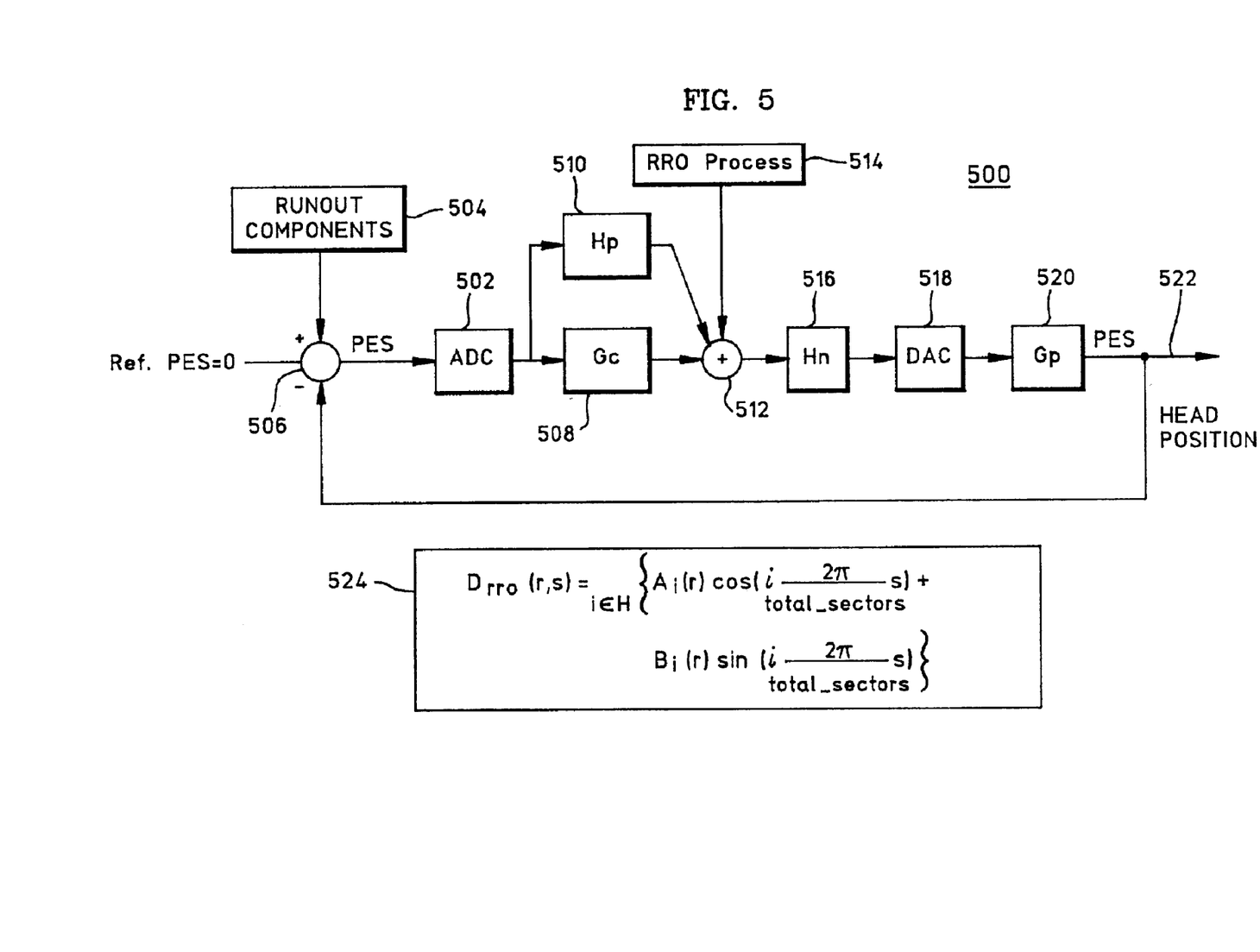
FIG. 5 is a servo scheme of a data storage device of the present application, which utilizes a unique RRO technique to reduce RRO error.

Reference will now be made to the drawings for further explanation of the inventive methods and apparatus. FIG. 5 is a block diagram of a servo control system 500 of the present application, which utilizes a unique RRO compensation technique to reduce head position error. The servo scheme of FIG. 5 may be embodied in a direct access storage device (DASD), such as a disk drive. Servo control system 500 includes an analog-to-digital converter (ADC) 502, a first summer 506, a vibration reduction process 508 represented as $G_c$, a peak filter 510 represented as $H_p$, an RRO process 514, a second summer 512, a notch filter 516 represented as $H_n$, a digital-to-analog converter (DAC) 518, an actuator 520 (plant or mechanical actuator dynamics) represented as $G_p$, and an output 522. $G_c$, $H_p$, $H_n$, and $G_p$ are frequency domain representations of the associated components. Peak filter 510 is typically used to reduce vibration for low frequencies of the RRO. Although peak filter 510 is shown as being in parallel with vibration reduction process 508, it may be placed in series therewith. Notch filter 516 is typically used to reduce high frequencies of non-repeatable runout (NRRO) error. Vibration reduction process 508 and RRO process 514 may be implemented as software code in a digital signal processor (DSP).

Servo control system 500 is also illustrated with a block 504 which represents runout components (e.g. RRO), shown as being summed in first summer 506 with the initial PES. An analog PES, which includes the undesirable RRO components, is fed into ADC 502 and converted into digital data. The digital data is fed into vibration reduction process 508 and peak filter 510, each of which have an output fed into second summer 512. RRO process 514, which is used to provide for RRO compensation in the present application, has an output which is also fed into second summer 512. An output of second summer 512 provides a sum of the outputs from vibration reduction process 508, peak, filter 510, and RRO process 514 into notch filter 516. An output of notch filter 516 is fed into DAC 518 to be converted into an analog signal. The analog signal from the output of notch filter 516 is fed into actuator 520, which has output 522 providing for the modified PES. This PES is also fed into first summer 506 as feedback.

It has been observed that RRO varies as a function of disk position, not only radially (i.e. across tracks, e.g. from ID to OD) but circumferentially as well (i.e. across sectors, e.g. from sector to sector along the same track). For example, refer to the above discussion described in relation to FIG. 2. Advantageously, servo control system 500 as described in the present application helps reduce RRO based on this observation, with use of RRO process 514.

Generally, the present application involves identifying a relationship for RRO error as a continuous function of track number (or cylinder number) and sector number. When a current track number and sector number for reading or writing data is thereafter identified, an estimation of the RRO error is calculated based on the relationship and the position error signal is reduced using the estimated RRO error.

As shown in an equation block 524 of FIG. 5, RRO process 514 performs RRO compensation based on the relation $$D_{RRO}(r,s) = \Sigma_{i \text{ for all } H}\{A_i(r)\cos(i(s2\pi/\text{total\_sectors})) + B_i(r)\sin(i(s2\pi/\text{total\_sectors}))\}$$

where H represents a set of harmonics to be compensated; i represents a particular RRO harmonic number to be compensated; $A_i(r)$ represents $A_i(r) = a_n r^n + a_{(n-1)} r^{(n-1)} + \ldots + a_1 r + a_0$; $B_i(r)$ represents $B_i(r) = b_n r^n + b_{(n-1)} r^{(n-1)} + \ldots + b_1 r + b_0$; s represents a sector number along track r; and total_sectors represents a total number of sectors along track r.

The above polynomial equation $A_i(r)$ represents a best fit curve of real values calculated from discrete Fourier transforms of RRO measurements of a limited number of disk tracks across the disk. Similarly, the above polynomial equation $B_i(r)$ represents a best fit curve of imaginary values calculated from the same discrete Fourier transforms of the RRO measurements. The polynomial coefficients are generated during calibration and stored in memory for use in subsequent RRO compensation, as will be described further below.

Figure 6:
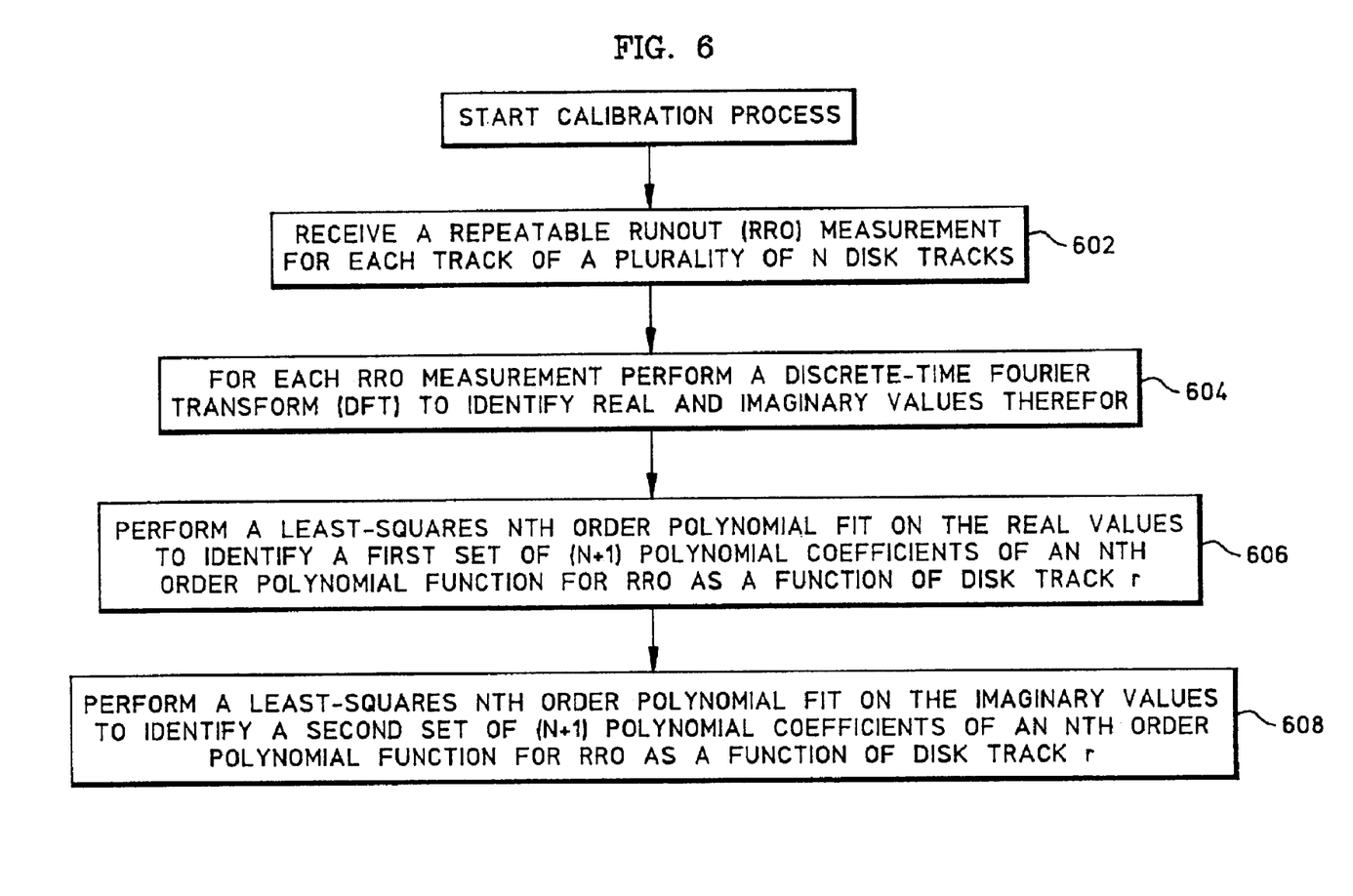
FIG. 6 is a flowchart of a method of performing an RRO calibration process of the present application.

FIG. 6 is a flowchart of a method of performing an RRO calibration process of the present application. This calibration process may be performed once for a disk drive (e.g. after or as part of its manufacture), or a plurality of times over operation of the disk drive (e.g. during each spin up or power up, or periodically when in idle mode). Repeatable runout (RRO) measurements for each track of a limited number of N disk tracks across the disk are obtained (step 602 of FIG. 6). Each RRO measurement associated with a track includes a plurality of position error signal (PES) measurements for all of the equally-spaced sectors along the track. Preferably, each RRO measurement associated with a track is based on average PES for each sector on the track. Also preferably, the number N of disk tracks for which measurements are taken is much less than the total number of tracks on the disk. For example, the number N may be between 5–10 for a disk having 60,000 tracks.

Figure 8:
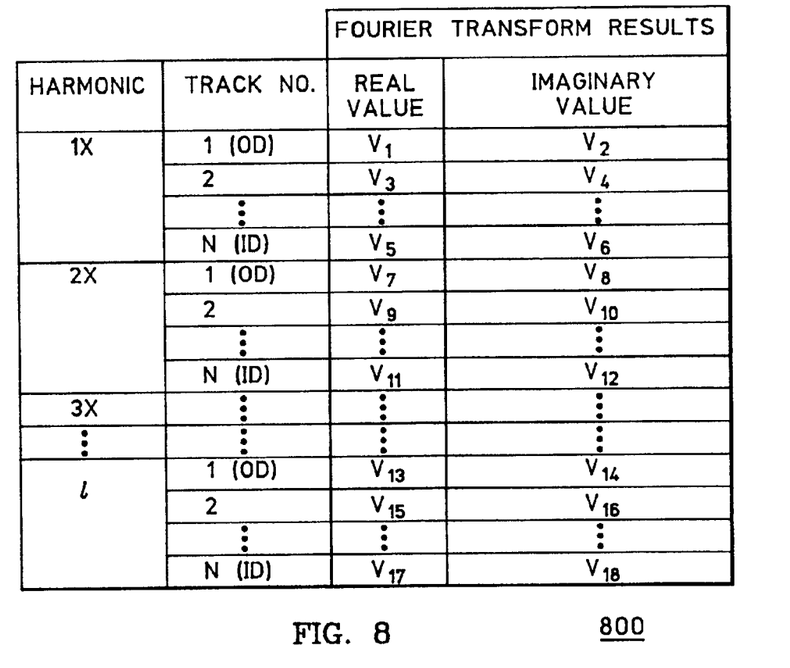
FIG. 8 is a table of results from discrete Fourier transforms (DFTs) of RRO measurements across the disk obtained from the calibration process of FIG. 6.

For each RRO measurement associated with a track, a discrete Fourier transform (DFT) is performed on the RRO to identify real and imaginary values therefor (step 604 of FIG. 6). This is done for each RRO harmonic in consideration, which is preferably more than one or two harmonics (e.g. 3 RRO harmonics such as harmonics 1 through 3). Referring to FIG. 5, a table 500 is shown which illustrates one form of generic results from Fourier transforms taken of RRO measurements across the disk. The $1^{st}$ column in table 500 provides the RRO harmonic in consideration (i=1X, 2X, 3X, . . . ), the $2^{nd}$ column provides the track number in consideration (1, 2, . . . , N), and the last column provides the DFT results in two subcolumns which includes the real value component and the imaginary value component (values "v") of the DFT results. Next, a least-squares nth-order polynomial fit calculation is performed on the real values to identify a first set of (n+1) polynomial coefficients of a first nth-order polynomial function (step 606 of FIG. 6). Similarly, a least-squares nth-order polynomial fit calculation is performed on the imaginary values to identify a second set of (n+1) polynomial coefficients of a second nth-order polynomial function (step 608 of FIG. 6). The least-squares fit for real and imaginary portions are performed for each RRO harmonic in consideration. A least-squares fit may be performed, for example, with use of a Gauss Jordan Reduction method. However, any suitable technique may be used to identify suitable polynomial coefficients and/or suitable polynomial functions.

Figure 9:
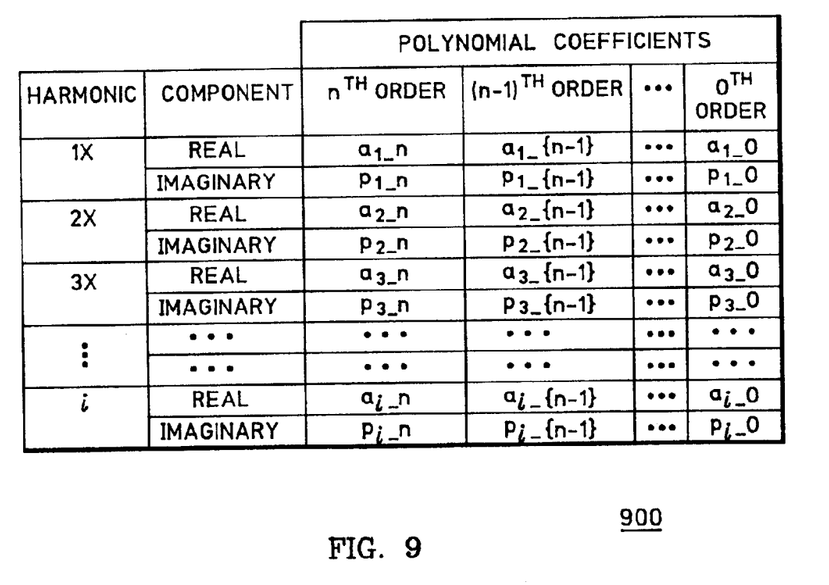
FIG. 9 is a table of polynomial coefficients for polynomial functions obtained from the calibration process of FIG. 6.

From step 606, the nth-order polynomial function derived from the "real" values may be representable in the form $A_i(r) = a_n r^n + a_{(n-1)} r^{(n-1)} + \ldots + a_1 r + a_0$, where $a_n, a_{(n-1)}, \ldots, a_1, a_0$ are the real polynomial coefficients. From step 608, the nth-order polynomial function derived from the "imaginary" values may be representable in the form $B_i(r) = b_n r^n + b_{(n-1)} r^{(n-1)} + \ldots + b_1 r + b_0$, where $b_n, b_{(n-1)}, \ldots, b_1, b_0$ are the imaginary polynomial coefficients. In FIG. 6, a table 600 of generic polynomial coefficients for polynomial functions obtained from the calibration process of FIG. 6 is shown. The $1^{st}$ column in table 600 provides the harmonic in consideration (i=1X, 2X, 3X, . . . ), the $2^{nd}$ column provides the component in consideration (real or imaginary), and the last column provides the polynomial coefficients in n+1 subcolumns (nth-order, (n−1)th order, . . . , $0^{th}$ order). All of the polynomial coefficients determined during calibration are stored in memory of the data storage device. For example, the polynomial coefficients may be stored in electronically erasable/programmable read-only memory (EEPROM), flash memory, etc.

Figure 7:
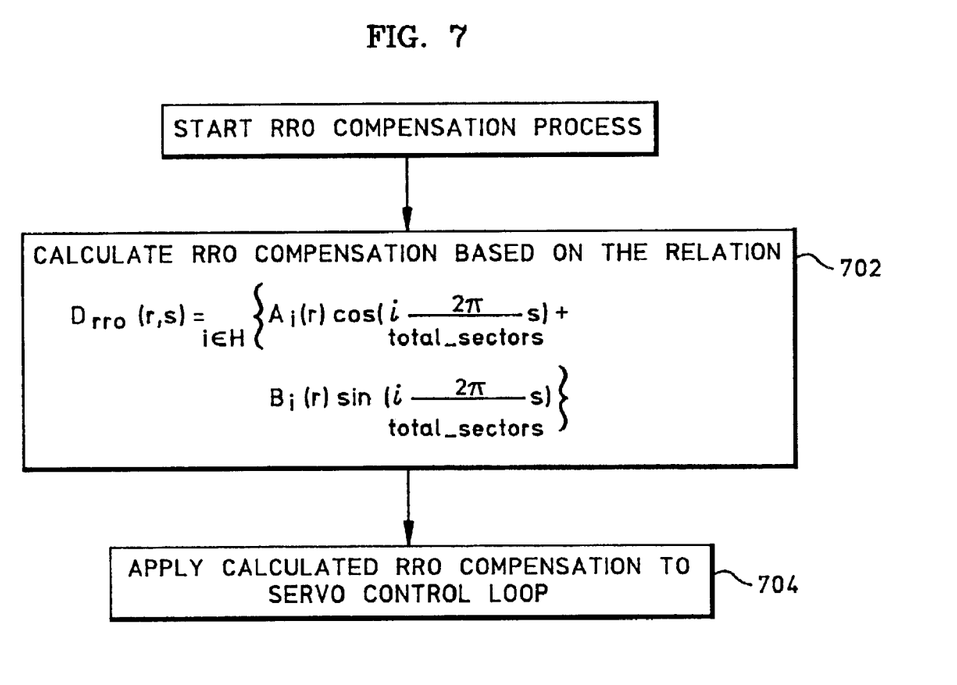
FIG. 7 is a flowchart of a method of performing an RRO compensation process of the present application.

Referring back to FIG. 7, a flowchart of a method of performing an RRO compensation process will now be described; this process uses the stored calibration results from the method of FIG. 6 to compensate the RRO. Recall that, from the calibration process described in relation to FIG. 6, a first set of (n+1) coefficients of a first nth-order polynomial function, which is representable in the form $A_i(r) = a_n r^n + a_{(n-1)} r^{(n-1)} + \ldots + a_1 r + a_0$, are calculated and stored in memory (i.e. from step 604). In addition, a second set of (n+1) coefficients of a second nth-order polynomial function, which is representable in the form $B_i(r) = b_n r^n + b_{(n-1)} r^{(n-1)} + \ldots + b_1 r + b_0$, are also calculated and stored in memory (i.e. from step 606).

Typically, the disk drive performs a "SEEK" operation when positioning its read/write head to a particular disk location prior to reading from or writing to the disk. A current track number and sector number are identified to position the read/write head. Using these values, RRO compensation is calculated (step 702 of FIG. 7) based on the relation $$D_{RRO}(r,s) = \Sigma_{i \text{ for all } H}\{A_i(r)\cos(i(s2\pi/\text{total\_sectors})) + B_i(r)\sin(i(s2\pi/\text{total\_sectors}))\}$$

where H represents a set of harmonics to be compensated; i represents a particular harmonic number to be compensated; $A_i(r)$ represents $A_i(r) = a_n r^n + a_{(n-1)} r^{(n-1)} + \ldots + a_1 r + a_0$; $B_i(r)$ represents $B_i(r) = b_n r^n + b_{(n-1)} r^{(n-1)} + \ldots + b_1 r + b_0$; s represents a sector number along track r; and total_sectors represents a total number of sectors along track r. The calculated RRO compensation is applied to the servo control loop to reduce or eliminate the RRO (step 704 of FIG. 7) (e.g. see FIG. 5). Prior to compensation, a translation from the calculated value and DAC units is also performed (e.g. see FIG. 5).

Figure 10:
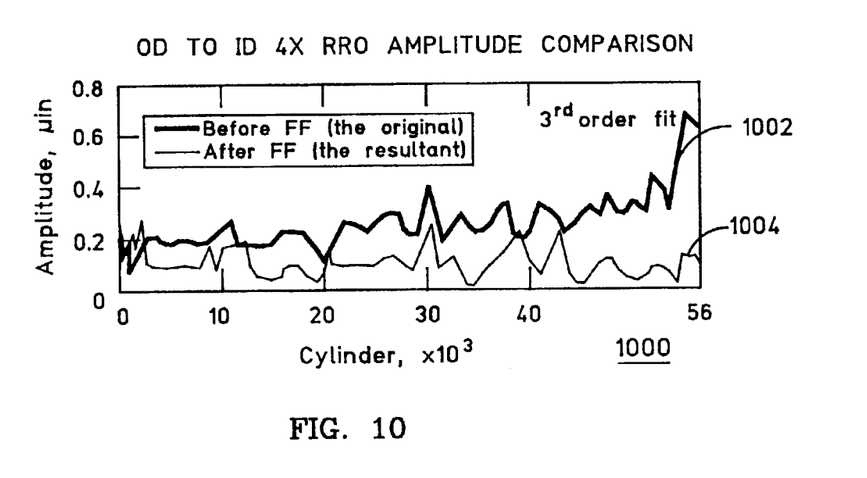
FIG. 10 is a graph which shows one example of RRO before and after RRO compensation of the present application.

FIG. 10 is a graph 1000 which shows an example of RRO before and after RRO compensation of the present application. An RRO error signal 1002, which in this example is a fourth harmonic of the RRO, is shown to "ramp" from OD to ID. As apparent, a compensated RRO error signal 1004 of the present application is shown to reduce this ramping. In this example, compensated RRO error signal 1004 is generated based on $3^{rd}$ order real polynomial functions (i.e. n=3).

In addition to the method which has been described, an apparatus for use in reducing RRO error in a servo signal for a data storage device comprises memory and processor instructions stored in the memory which are executable to perform the methods. Also, a data storage device includes at least one rotatable magnetic disk; a disk drive motor for use in rotating the at least one rotatable magnetic disk; a magnetic head for use in reading or writing data to the at least one rotatable magnetic disk; an actuator for use in positioning the magnetic head; and one or more processors of the data storage device for use in performing the methods described herein.

As apparent, the present technique expresses the RRO characteristics as a set of complex coefficients based on limited RRO measurements collected during spin up and/or an idle sweep recalibration process, allowing for radial variations of the amplitude and/or phase of the RRO. It uses "limited" file-level, servo-track RRO measurements to generate a "continuous" description based on nth-order least-square polynomial fit functions, so that a particular amplitude and phase can be estimated from the outermost (OD) to innermost (ID) tracks during feedforward compensation in servo control. This provides an efficient way to solve "radially" ramping of the RRO at the ID caused by a thermal expansion mismatch between the hub and the disk, non-uniform surface flatness of the spacers, and non-evenly or periodically distributed stress due to torque force of a screw which is applied at the top of the disk clamp.

The present technique is not restricted to "phase coherent" RRO (i.e. phase that is the same across the entire disk surface) but provides a certain number of degrees to compensate for "non-coherent" phase which is learned across the disk. One source of such non-coherent phase RRO is the "written-in" RRO due to pitch mode interactions during servo writing. This technique can be applied to reduce RRO during error recovery by compensating with the best-estimated amplitudes and phases. The scheme is also adaptive to different track formats in which the servo sector numbers (or wedges) can be different from the OD to ID. Since it is adaptive to different track formats, the linear density (bpi) of the disk may be increased to thereby increase the overall capacity of the data storage device by increasing the number of servo sectors at the OD.

Some conventional RRO compensation schemes provide for compensation based on disk location in a limited way. However, the RRO compensation scheme of the present application characterizes and compensates the RRO fully in an accurate and efficient manner. Efficiencies in computation, design, and use of memory are obtained with the present RRO compensation scheme.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special particular meaning different from its plain language meaning, and therefore the specification is not to be used to define terms in an unduly narrow sense.

What is claimed is:

1. In a data storage device, a method of reducing repeatable runout (RRO) error comprising:
   receiving a plurality of RRO measurements for a plurality of disk tracks;
   for each one of one or more RRO harmonics to be compensated:
      performing a discrete Fourier transform (DFT) on each RRO measurement for the RRO harmonic to identify a real value and an imaginary value associated with each disk track;
      identifying, from the real values, a first set of (n+1) polynomial coefficients of a first nth-order polynomial function as a function of disk track;
      identifying, from the imaginary values, a second set of (n+1) polynomial coefficients of a second nth-order polynomial function as a function of disk track; and
      storing the first and the second sets of (n+1) polynomial coefficients for use in RRO compensation.

2. The method of claim 1, wherein the first set of polynomial coefficients are identified by performing a least-squares fit on the real values and the second set of polynomial coefficients are identified by performing a least-squares fit on the imaginary values.

3. The method of claim 1, wherein the plurality of disk tracks comprises a limited number of disk tracks on the disk.

4. The method of claim 1, wherein the first nth-order polynomial function comprises a best fit curve for the real values and wherein the second nth-order polynomial function comprises a best fit curve for the imaginary values.

5. The method of claim 1, wherein performing RRO compensation comprises:
   providing an RRO function which is a function of current disk track and a current sector number;
   identifying a current disk track and a current sector number;
   selecting polynomial coefficients from the first and the second sets which correspond to the current disk track;
   executing the RRO function based on the current disk track, the current sector number, and the selected polynomial coefficients, to thereby estimate a current RRO error; and
   performing RRO compensation based on the current RRO error.

6. The method of claim 1, wherein RRO compensation is based on a predetermined function which is expressible as:

$$D_{RRO}(r,s) = \Sigma_{i\ for\ all\ H}\{A_i(r)\cos(i(s2\pi/\text{total\_sectors})) + B_i(r)\sin(i(s2\pi/\text{total\_sectors}))\}$$

where r is a track number; s is a sector number at track number r; i is an RRO harmonic number; H is a set of harmonics to be compensated; total_sectors is a total number of sectors along track number r;
where $A_i(r) = a_n r^n + a_{(n-1)} r^{(n-1)} + \ldots + a_1 r + a_0$ is the first nth-order polynomial function which is a best fit curve of the real values determined from the DFTs; and
where $B_i(r) = b_n r^n + b_{(n-1)} r^{(n-1)} + \ldots + b_1 r + b_0$ is the second nth-order polynomial function which is a best fit curve of the imaginary values determined from the DFTs.

7. An apparatus for use in reducing a repeatable runout (RRO) error for a data storage device, the apparatus comprising:
   memory;
   processor instructions stored in the memory;
   the processor instructions executable by a processor for:
      receiving a plurality of RRO measurements associated with a plurality of disk tracks;
      for each one of one or more RRO harmonics to be compensated:
         performing a discrete Fourier transform (DFT) on each RRO measurement for the RRO harmonic to identify a real value and an imaginary value associated with each disk track;
         identifying, from the real values, a first set of (n+1) polynomial coefficients of a first nth-order polynomial function as a function of disk track;
         identifying, from the imaginary values, a second set of (n+1) polynomial coefficients of a second nth-order polynomial function as a function of disk track; and storing the first and the second sets of (n+1) polynomial coefficients for use in RRO compensation.

8. The apparatus of claim 7, wherein the processor comprises a digital signal processor (DSP).

9. The apparatus of claim 7, wherein the first set of polynomial coefficients are identified by performing a least-squares fit on the real values and the second set of polynomial coefficients are identified by performing a least-squares it on the imaginary values.

10. The apparatus of claim 7, wherein the plurality of disk tracks comprises a limited number of disk tracks on the disk.

11. The apparatus of claim 7, wherein the first nth-order polynomial function comprises a best fit curve for the real values and wherein the second nth-order polynomial function comprises a best fit curve for the imaginary values.

12. The apparatus of claim 7, wherein RRO compensation is based on a predetermined function which is expressible as:

$$D_{RRO}(r,s) = \Sigma_{i \text{ for all } H} \{A_i(r)\cos(i(s2\pi/\text{total\_sectors})) + B_i(r)\sin(i(s2\pi/\text{total\_sectors}))\}$$

where r is a track number; s is a sector number at track number r; i is an RRO harmonic number; H is a set of harmonics to be compensated; total_sectors is a total number of sectors along track number r;

where $A_i(r) = a_n r^n + a_{(n-1)} r^{(n-1)} + \ldots + a_1 r + a_0$ is the first nth-order polynomial function which is a best fit curve of the real values determined from the DFTs; and where $B_i(r)$ is $b_n r^n + b_{(n-1)} r^{(n-1)} + \ldots + b_1 r + b_0$ is the second nth-order polynomial function which is a best fit curve of the imaginary values determined from the DFTs.

13. A data storage device, comprising:

at least one rotatable magnetic disk;

a disk drive motor for use in rotating the at least one rotatable magnetic disk;

a magnetic head for use in reading and/or writing data to the at least one rotatable magnetic disk;

an actuator for use in positioning the magnetic head;

one or more processors of the data storage device for use in:

receiving a plurality of RRO measurements associated with a plurality of disk tracks of the disk;

for each one of one or more RRO harmonics to be compensated:

performing a discrete Fourier transform (DFT) on each RRO measurement for the RRO harmonic to identify a real value and an imaginary value associated with each disk track;

identifying, from the real values, a first set of (n+1) polynomial coefficients of a first nth-order polynomial function as a function of disk track;

identifying, from the imaginary values, a second set of (n+1) polynomial coefficients of a second nth-order polynomial function as a function of disk track; and storing the first and the second sets of (n+1) polynomial coefficients for use in RRO compensation.

14. The data storage device of claim 13, wherein the first set of polynomial coefficients are identified by performing a least-squares fit on the real values and the second set of polynomial coefficients are identified by performing a least-squares fit on the imaginary values.

15. The data storage device of claim 13, wherein the plurality of disk tracks comprises a limited number of disk tracks on the disk.

16. The data storage device of claim 13, wherein the first nth-order polynomial function comprises a best fit curve for the real values and wherein the second nth-order polynomial function comprises a best fit curve for the imaginary values.

17. The data storage device of claim 13, wherein the processor is for use in performing RRO compensation which comprises:

providing an RRO function which is a function of current disk track and a current sector number;

identifying a current disk track and a current sector number;

selecting polynomial coefficients from the first and the second sets which correspond to the current disk track;

executing the RRO function based on the current disk track, the current sector number, and the selected polynomial coefficients, to thereby estimate a current RRO error; and performing RRO compensation based on the current RRO error.

18. The data storage device of claim 13, wherein RRO compensation is based on a predetermined function which is expressible as:

$$D_{RRO}(r,s) = \Sigma_{i \text{ for all } H} \{A_i(r)\cos(i(s2\pi/\text{total\_sectors})) + B_i(r)\sin(i(s2\pi/\text{total\_sectors}))\}$$

where r is a track number; s is a sector number at track number r; i is an RRO harmonic number; H is a set of harmonics to be compensated; total_sectors is a total number of sectors along track number r;

where $A_i(r) = a_n r^n + a_{(n-1)} r^{(n-1)} + \ldots + a_1 r + a_0$ is the first nth-order polynomial function which is a best fit curve of the real values determined from the DFTs; and where $B_i(r)$ is $b_n r^n + b_{(n-1)} r^{(n-1)} + \ldots + b_1 r + b_0$ is the second nth-order polynomial function which is a best fit curve of the imaginary values determined from the DFTs.

19. In a data storage device, a method for use in reducing repeatable runout (RRO) error comprising:

estimating RRO error based on a predetermined function;

performing RRO compensation with use of the estimated RRO error;

the predetermined function being expressible as:

$$D_{RRO}(r,s) = \Sigma_{i \text{ for all } H} \{A_i(r)\cos(i(s2\pi/\text{total\_sectors})) + B_i(r)\sin(i(s2\pi/\text{total\_sectors}))\}$$

where r is a track number; s is a sector number at track number r; i is an RRO harmonic number; H is a set of one or more harmonics to be compensated; total_sectors is a total number of sectors along track number r;

where $A_i(r) = a_n r^n + a_{(n-1)} r^{(n-1)} + \ldots + a_1 r + a_0$ is a best fit curve of real values from a discrete Fourier transform (DFT) of a plurality of RRO measurements of a plurality of disk tracks; and where $B_i(r)$ is $b_n r^n + b_{(n-1)} r^{(n-1)} + \ldots + b_1 r + b_0$ is a best fit curve of imaginary values from a DFT of the RRO measurements of the plurality of disk tracks.

20. The method of claim 19, wherein the polynomial coefficients for $A_i(r)$ are determined by a least-squares fit of the real values and the polynomial coefficients for $B_i(r)$ are determined by a least-squares fit of the imaginary values.

21. The method of claim 19, wherein $i \geq 2$.

22. The method of claim 19, wherein the polynomial coefficients a and b are determined during calibration.

23. A data storage device, comprising:

memory;

repeatable runout (RRO) data stored in the memory;

the RRO data comprising:

- a first set of (n+1) polynomial coefficients of a first nth-order polynomial best fit function for real values derived from a discrete Fourier transform (DFT) of a plurality of RRO measurements of a plurality of disk tracks across a disk;
- a second set of (n+1) polynomial coefficients of a second nth-order polynomial function which represents a best fit curve for imaginary values derived from the DFT of the RRO measurements; and one or more processors for use in reducing RRO with use of the RRO data.

24. The data storage device of claim 23, wherein the first nth-order polynomial function is representable in the form $A_i(r)=a_n r^n + a_{(n-1)} r^{(n-1)} + \ldots + a_1 r + a_0$ and the second nth-order polynomial is representable in the form $B_i(r)$ is $b_n r^n + b_{(n-1)} r^{(n-1)} + \ldots + b_1 r + b_0$, where i represents an RRO harmonic number.

25. The data storage device of claim 23, wherein the first and the second sets of polynomial coefficients represent coefficients for a first RRO harmonic, and wherein the RRO data further comprises additional first and second sets of polynomial coefficients for a second RRO harmonic.

26. The data storage device of claim 23, further comprising:

wherein the first set of (n+1) polynomial coefficients for the real values are derived from a least-squares fit of the real values; and wherein the second set of (n+1) polynomial coefficients for the imaginary values are derived from a least-squares fit of the imaginary values.

27. The data storage device of claim 23, wherein the one or more processors are for use in:

estimating RRO error with use of the RRO data and a predetermined function.

28. The data storage device of claim 23, wherein the one or more processors are for use in:

estimating RRO error with use of the RRO data and a predetermined function; and performing RRO compensation with use of the estimated RRO error.

29. The data storage device of claim 23, wherein the first nth-order polynomial function is representable in the form $A_i(r)=a_n r^n + a_{(n-1)} r^{(n-1)} + \ldots + a_1 r + a_0$ and the second nth-order polynomial is representable in the form $B_i(r)$ is $b_n r^n + b_{(n-1)} r^{(n-1)} + \ldots + b_1 r + b_0$, where i represents an RRO harmonic number, and wherein the one or more processors are for:

estimating RRO error with use of the RRO data and a predetermined function;

performing RRO compensation with use of the estimated RRO error; and the predetermined function being expressible as:

$$D_{RRO}(r,s) = \Sigma_{i \text{ for all } H}\{A_i(r)\cos(i(s2\pi/\text{total\_sectors})) + B_i(r)\sin(i(s2\pi/\text{total\_sectors}))\}$$

where r is a track number; s is a sector number at track number r; i is an RRO harmonic number; H is a set of one or more harmonics to be compensated; and total\_sectors is a total number of sectors along track number r.

30. The data storage device of claim 24, wherein the one or more processors comprise a digital signal processor (DSP).

* * * * *

UNITED STATES PATENT AND TRADEMARK OFFICE
CERTIFICATE OF CORRECTION

PATENT NO. : 6,937,424 B2
DATED : August 30, 2005
INVENTOR(S) : Chang et al.

It is certified that error appears in the above-identified patent and that said Letters Patent is hereby corrected as shown below:

Title page,
Item [73], "Assignee:  Hitachi Global Storage Technologies Netherlands N.V., Amsterdam (NL)" changed to
-- Assignee:  Hitachi Global Storage Technologies Netherlands B.V., Amsterdam (NL) --.

Signed and Sealed this

First Day of November, 2005

JON W. DUDAS
*Director of the United States Patent and Trademark Office*